(12) United States Patent
Russ (10) Patent No.: US 9,013,133 B2
(45) Date of Patent: Apr. 21, 2015

(54) METHOD AND APPARATUS FOR STEPPER MOTOR STALL DETECTION

(75) Inventor: Ronald Paul Russ, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 257 days.

(21) Appl. No.: 13/151,339

(22) Filed: Jun. 2, 2011

(65) Prior Publication Data

US 2012/0304914 A1 Dec. 6, 2012

(51) Int. Cl.
*H02P 8/00* (2006.01)
*H02P 8/22* (2006.01)

(52) U.S. Cl.
CPC .......................................... *H02P 8/22* (2013.01)

(58) Field of Classification Search
USPC ..................... 318/696, 400.21, 430, 431, 432
See application file for complete search history.

(56) References Cited

U.S. PATENT DOCUMENTS

| | | | |
|---|---|---|---|
| 5,032,781 A | 7/1991 | Kronenberg | |
| 5,665,897 A * | 9/1997 | Lippmann et al. | ............. 73/1.01 |
| 5,847,531 A | 12/1998 | Hoffsommer et al. | |
| 6,014,075 A | 1/2000 | Fujimori et al. | |
| 6,150,789 A | 11/2000 | Pulford, Jr. | |
| 6,519,999 B2 | 2/2003 | Komura et al. | |
| 6,611,072 B1 | 8/2003 | Ellerthorpe et al. | |
| 6,667,595 B2 | 12/2003 | Wiseman | |
| 6,713,985 B2 | 3/2004 | Aoshima | |
| 6,861,817 B2 | 3/2005 | Pigott et al. | |
| 7,145,309 B2 | 12/2006 | Reiter et al. | |
| 7,170,254 B2 | 1/2007 | Yamada | |
| 7,239,108 B2 | 7/2007 | Best | |
| 7,569,970 B2 | 8/2009 | Iwata et al. | |
| 7,705,555 B2 * | 4/2010 | Pinewski et al. | ............. 318/696 |
| 7,812,562 B2 | 10/2010 | Russ | |
| 2004/0222779 A1 * | 11/2004 | Cock et al. | ................. 324/76.77 |
| 2007/0132422 A1 | 6/2007 | Rondot et al. | |
| 2009/0066274 A1 | 3/2009 | Liu et al. | |
| 2009/0174358 A1 * | 7/2009 | Russ | ............................. 318/685 |

FOREIGN PATENT DOCUMENTS

DE 44 23 119 C1 12/1995
EP 0848259 A1 6/1998

* cited by examiner

*Primary Examiner* — Bentsu Ro
*Assistant Examiner* — Iftekhar Mustafa
(74) *Attorney, Agent, or Firm* — Dickinson Wright, PLLC (57) ABSTRACT

A method of detecting a stall condition in a stepper motor with very little movement of an instrument pointer coupled to the stepper motor. The stepper motor rotates the instrument pointer in a first direction towards a pointer stop by a plurality of micro-steps. The stepper motor then rotates the pointer in the first direction at least one additional micro-step while monitoring a back electro-motive force (EMF) produced by the stepper motor. If the instrument pointer is abutting the pointer stop, then the stepper motor will be compressed slightly. If the back EMF is below a predetermined threshold, then the stepper motor is in a stall condition. The instrument pointer can then be micro-stepped in a second direction opposite the first direction to a micro-rotor offset value (μROV) position.

15 Claims, 9 Drawing Sheets

METHOD AND APPARATUS FOR STEPPER MOTOR STALL DETECTION

BACKGROUND OF THE INVENTION

1. Field of the Invention

The present invention relates to a stepper motor assembly. More particularly, the invention relates to a control system and a method for detecting a stall condition in a stepper motor assembly.

2. Description of the Prior Art

A stepper motor is a type of electrical motor that can be incrementally stepped between various rotational positions. Stepper motors generally include a rotatable permanent magnet, a first inductive coil and a second inductive coil. The first and second inductive coils are in electrical communication with a control system, which selectively energizes and de-energizes the coils. When one of the coils is energized, it produces an electro-magnetic field to rotate the permanent magnet. The control system can either direct the stepper motor to take a "full-step" by energizing one coil while the other coil remains de-energized or a "micro-step" by substantially continuously driving both of the coils with out-of-phase voltages.

The control system for the stepper motor is generally an open loop system. In other words, the control system sends voltages to the first and second inductive coils to move the stepper motor, but the stepper motor does not communicate its absolute position back to the control system. To ensure the accuracy of the stepper motor, it is often necessary for the control system to perform a referencing operation on the stepper motor before each use of the stepper motor. Many stepper motor assemblies include a stop, either internal or external of the stepper motor, for stalling the stepper motor in a known position during the referencing operation. However, the control system still must be able to determine when the stepper motor is in a stall condition in order to ensure that the stepper motor is in the known position.

One way for the control system to determine that the stepper motor is in the stall condition is to measure the back electro-motive force (EMF) of the first and second inductive coils. In other words, when the control system is energizing one of the inductive coils and the other inductive coil is de-energized, the rotation of the permanent magnet will induce a voltage in the de-energized coil. This voltage is the back EMF, and it can be measured by the control system. A large back EMF reading means that the permanent magnet is spinning, and thus, the stepper motor is not in a stall condition. In contrast, a small back EMF reading means that the permanent magnet is stationary, and thus, the stepper motor is in a stall condition.

One process for determining that the stepper motor is in a stall condition is to rotate the stepper motor in one direction until it reaches a stop while monitoring the back EMF with the control system. Once the back EMF falls below a predetermined threshold, then the control system rotates the stepper motor back in the other direction while again monitoring the back EMF until it reaches a second stop, at which point, the back EMF again falls below a predetermined threshold. This referencing operation is generally known as a "welcome sweep".

The welcome sweep operation is undesirable for many applications, particularly when the stepper motor is coupled to an instrument pointer, e.g., a speedometer, a tachometer, etc. This is because the instrument pointer must sweep through a wide rotation range before the instrument pointer can accurately indicate the desired information, and this process takes an undesirable amount of time to execute. Even further, the welcome sweep operation is undesirable in the instrument panel of an automobile, which may include many instrument pointers (e.g. a speedometer, a tachometer, a fuel gauge, an oil pressure, a battery voltage, a coolant temperature, etc.), each driven by its own stepper motor.

There remains a significant and continuing need for a stepper motor assembly which can be homed to a predetermined reference position with little to no rotational movement.

SUMMARY OF THE INVENTION

The invention provides for a method and a control system for detecting a condition of a stepper motor. The method includes the step of micro-stepping the stepper motor in a first direction toward the stop for a predetermined number of micro-steps and at a predetermined amount of delay between each micro-step in order to position the stepper motor at least one and preferably two micro-steps past the next full step state. The method continues with the simultaneous steps of energizing one coil of the stepper motor in the first direction toward the stop for at least one (typically four) additional micro-step to compress the stepper motor against a stop and sampling the back electro-motive-force (EMF) of the un-driven coil of the stepper motor. The back EMF samples are then integrated and compared to a predetermined threshold to determine whether the stepper motor is in a stall condition.

When the stepper motor is coupled to an instrument pointer in an instrument panel of a vehicle, during normal operation of the stepper motor, very little movement (if any) of the instrument pointer is visible to the occupants of the vehicle during the referencing operation. In other words, when the driver starts the vehicle, he or she will not be distracted by the referencing operation. Moreover, the method of the present invention can be performed much quicker than the prior art referencing operations, and therefore, the stepper motor is ready for its normal operation very quickly.

If the stepper motor does not enter a stall condition during the referencing operation, then it means that the stepper motor was not in a proper-micro rotor offset value (μROV) position before beginning the referencing operation. In this case, the method can continue with the step of repeating the referencing operation, or the method can continue with the step of driving the stepper motor in the first direction against the stop while monitoring the back EMF to determine when the stepper motor is in a stall condition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
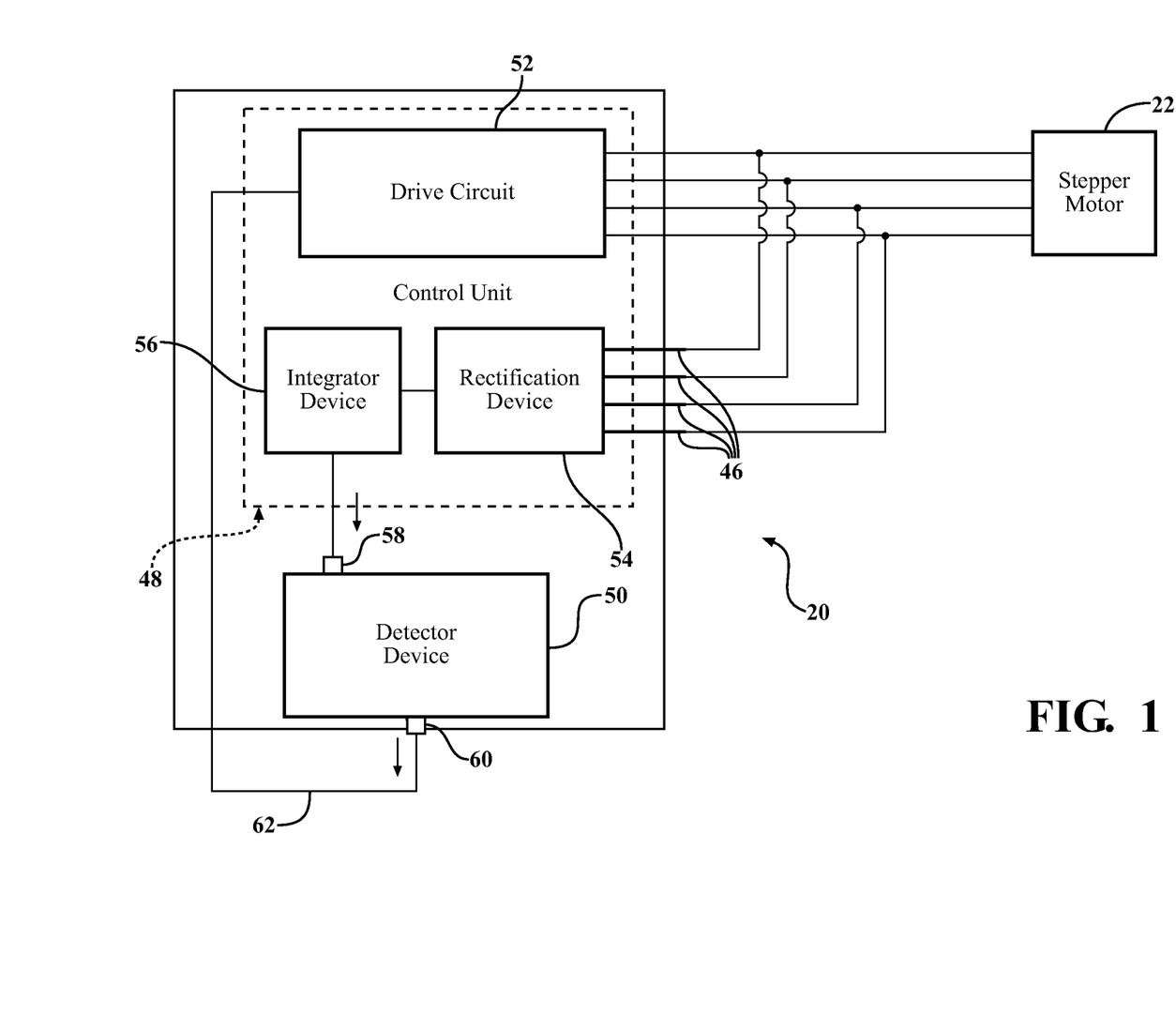
FIG. 1 is a schematic diagram of the exemplary control system in electrical communication with an exemplary stepper motor.

Referring to the Figures, wherein like numerals indicate corresponding parts throughout the several views, a programmable control system 20 for detecting a stall condition in a stepper motor 22 is generally shown in FIG. 1.

Figure 2:
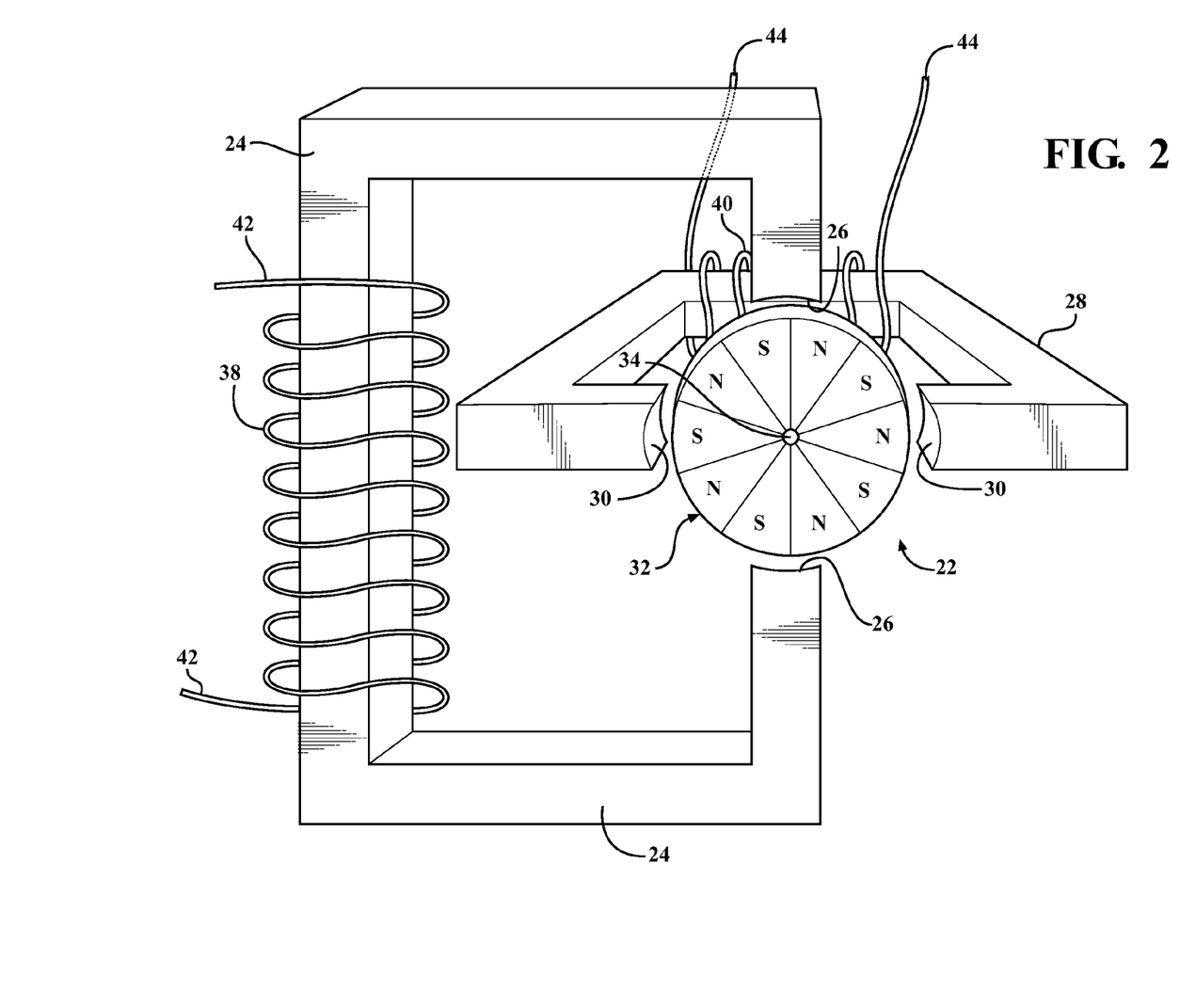
FIG. 2 is a front elevation view of the exemplary stepper motor.

An exemplary stepper motor 22 is generally shown in FIG. 2. The exemplary stepper motor 22 includes a first conductive core 24 having first conductive core ends 26 spaced from one another and a second conductive core 28 having second conductive core ends 30 spaced from one another. As shown in FIG. 2, the first and second conductive cores 24, 28 are generally C-shaped and oriented perpendicularly to one another such that the first core ends 26, are disposed adjacent to the second core ends 26, 30. The conductive cores 24, 28 are both of a magnetic material for conveying a magnetic field, as will be discussed in greater detail below.

Figure 4:
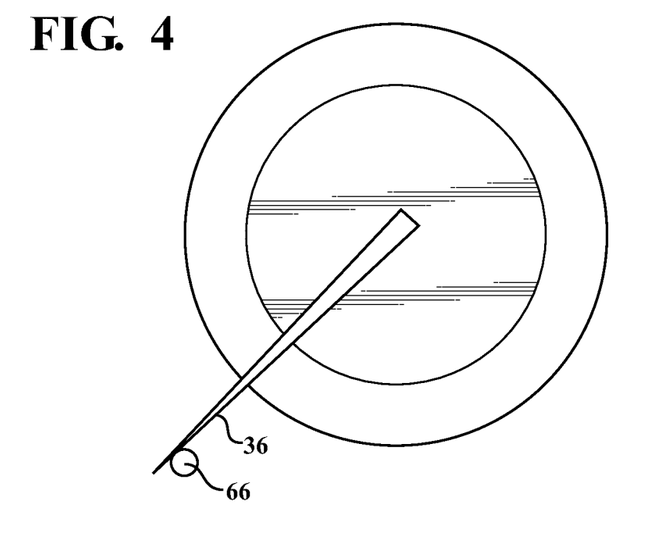
FIG. 4 is a front view of an exemplary instrument pointer in for an instrument panel of a vehicle.

The stepper motor 22 of the exemplary embodiment further includes a permanent magnet 32, which is generally indicated in FIG. 2, disposed adjacent the first and second conductive core ends 26, 30. The permanent magnet 32 of the exemplary embodiment includes five pairs of magnetic poles, labeled as "N" and "S" to designate a north magnetic pole and a south magnetic pole respectively. However, it should be appreciated that the permanent magnet 32 could have any desirable number of poles. It should also be appreciated that the permanent magnet 32 could have any desirable shape and is not limited to the cylindrical shape shown in FIG. 2. In the exemplary embodiment, the permanent magnet 32 is mounted on a rotatable rotor shaft 34, which is coupled to a secondary pointer 36, such as an instrument pointer 36 as shown in FIG. 4.

As best shown in FIG. 2, a first inductive coil 38 is wound around at least a portion of the first conductive core 24, and a second inductive coil 40 is wound around at least a portion of the second conductive core 28. The first inductive coil 38 includes first leads 42, and the second inductive coil 40 includes second leads 44. The first and second leads 42, 44 are electrically connected to a programmable control system 20 as shown in FIG. 1, which is electrically connected to a power source (not shown) for supplying electrical current to the first and second inductive coils 38, 40 to magnetize the first and second conductive cores 24, 28.

The programmable control system 20 is best shown in FIG. 1 and includes a plurality of programmable control system inputs 46, a control unit 48 and a detector device 50. The control system inputs 46 are electrically coupled to the stepper motor 22 and are adapted to receive an electrical signal, such as a sinusoidal or triangular voltage waveform, for example. Although the programmable control system 20 is shown having four programmable control system inputs 46, it should be appreciated that the programmable control system 20 may have any desirable number of control system inputs 46, and the control system inputs 46 could be connected to input sources other than the stepper motor 22.

The control unit 48 includes a drive circuit 52, a rectification device 54 and an integrator device 56. The drive circuit 52 is in electrical communication with the first and second leads 42, 44 of the stepper motor 22 for providing an electric current to the first and second induction coils 38, 40 of the stepper motor 22 to energize the first and second coils 38, 40. The rectification device 54 is in electrical communication with the programmable control system inputs 46 for receiving electrical signals from the first and second inductions coils 38, 40. The rectification device 54 may be any device for rectifying the signals from the stepper motor 22 and providing a rectified signal having a single polarity. In other words, any negative signals from the first and second inductive coils 38, 40 are made positive, or vice versa. The rectification device 54 could also amplify the signals from the first and second inductive coils 38, 40. The integrator device 56 is in electrical communication with the rectification device 54 for receiving the rectified signal. The integrator device 56 could be any device for producing an integrated signal that is proportional to the integral taken with respect to time of the rectified signal from the rectification device 54.

The detector device 50 includes a detector input 58 in electrical communication with the integrator device 56 for receiving the integrated signal. The detector device 50 may be any device capable of measuring the integrated signal and comparing the integrated signal to a predetermined threshold. The detector device 50 then produces a detector signal in response to the comparison of the integrated signal to the predetermined threshold. The detector device 50 could be, for example, a microcomputer. The detector device 50 may further include a programmable function, wherein the function provides measurements and analysis of characteristics of the stepper motor 22, which are measured from the integrated signal. The detector device 50 includes a detector output 60 in electrical communication with a feedback loop 62, which extends from the detector device 50 to the drive circuit 52 of the control unit 48. In operation, the detector device 50 provides the detector signal to the control unit 48 through the feedback loop 62, and the control unit 48 controls the first and second inductive coils 38, 40 according to the detector signal. Additionally, the detector device 50 could provide the detector signal to a display device (not shown) for allowing a user to analyze and interpret the detector signal.

In operation, the drive circuit 52 selectively applies a voltage across the first and second leads 42, 44 to cause an electric current to flow through the first and second inductive coils 38, 40, respectively. As the change in electric current occurs, a magnetic field is induced within the respective inductive coil. The magnetic field is then channeled through the associated conductive core toward the permanent magnet 32. When the magnetic field of the magnetized conductive core and the magnetic field from the permanent magnet 32 are not aligned, the permanent magnet 32 will rotate about the axis of the rotor shaft 34. Because opposite magnetic fields attract and like fields repel each other, this rotation continues until the magnetic fields of the permanent magnet 32 have aligned with the magnetic fields from the magnetized conductive coil. After the permanent magnet 32 has rotated into the new position, it settles and stops moving. To keep the permanent magnet 32 rotating, the magnetic field from both the first and second inductive coils 38, 40 must be changed periodically in a sequence with alternating voltages that keep the permanent magnet 32 in an unstable state and rotating in a desired direction. The speed of the rotation can be controlled by adjusting the magnitude of the voltage applied across the first and second leads 42, 44 and by adjusting the timing of the voltages.

Figure 3A:
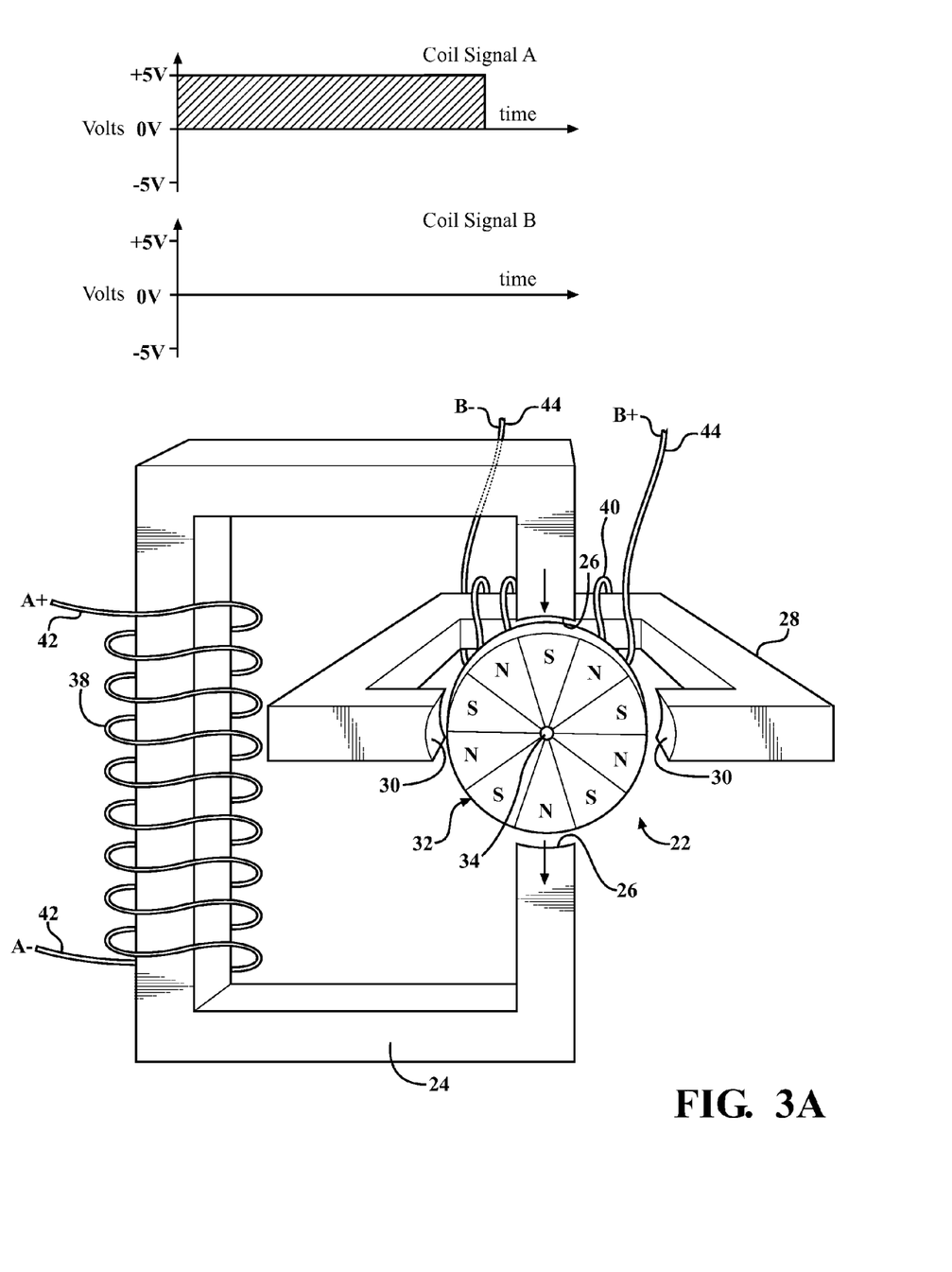
FIGS. 3A-3D are sequential diagrams illustrating the operation of the exemplary stepper motor of FIG. 2.
Figure 3B:
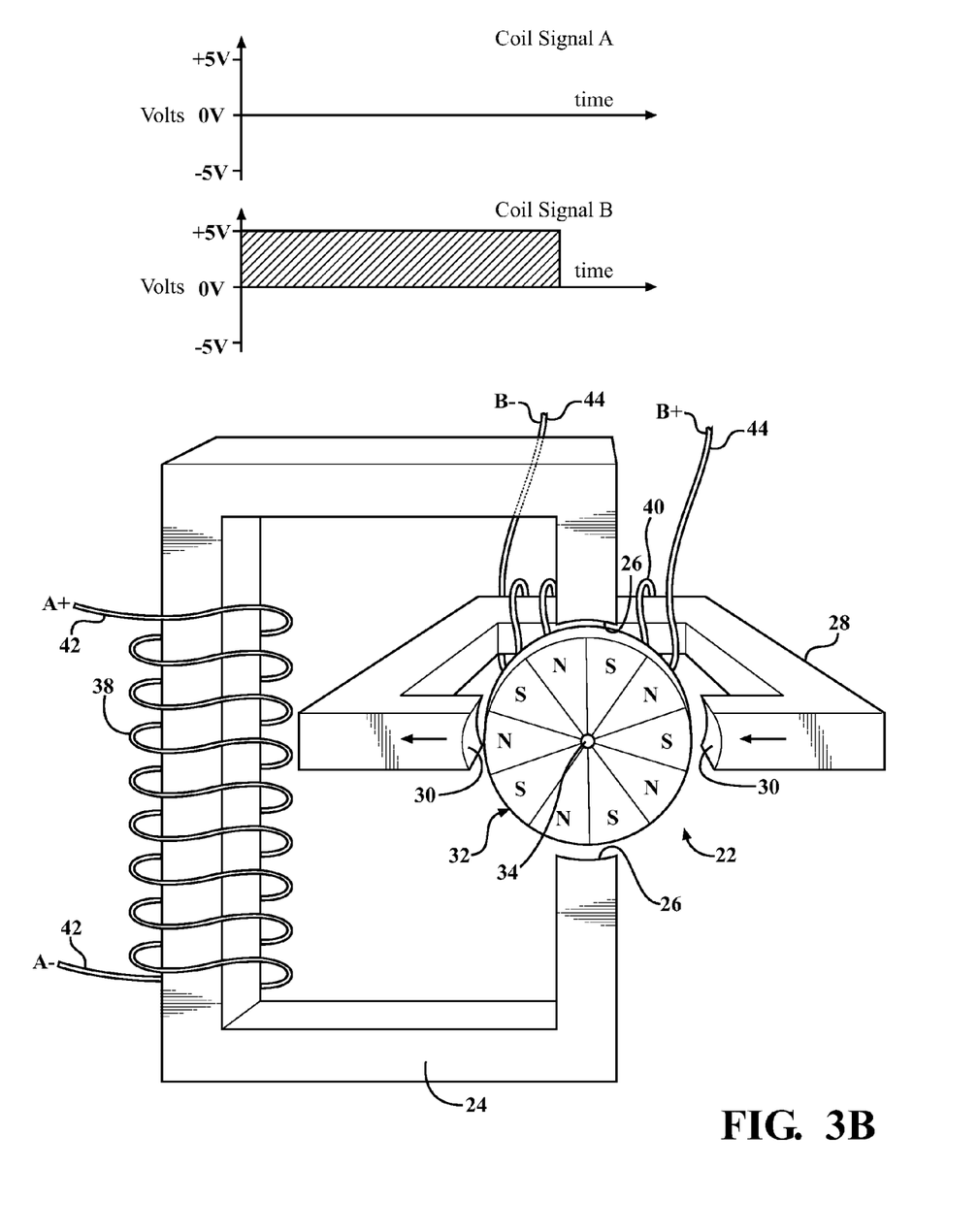
Figure 3C:
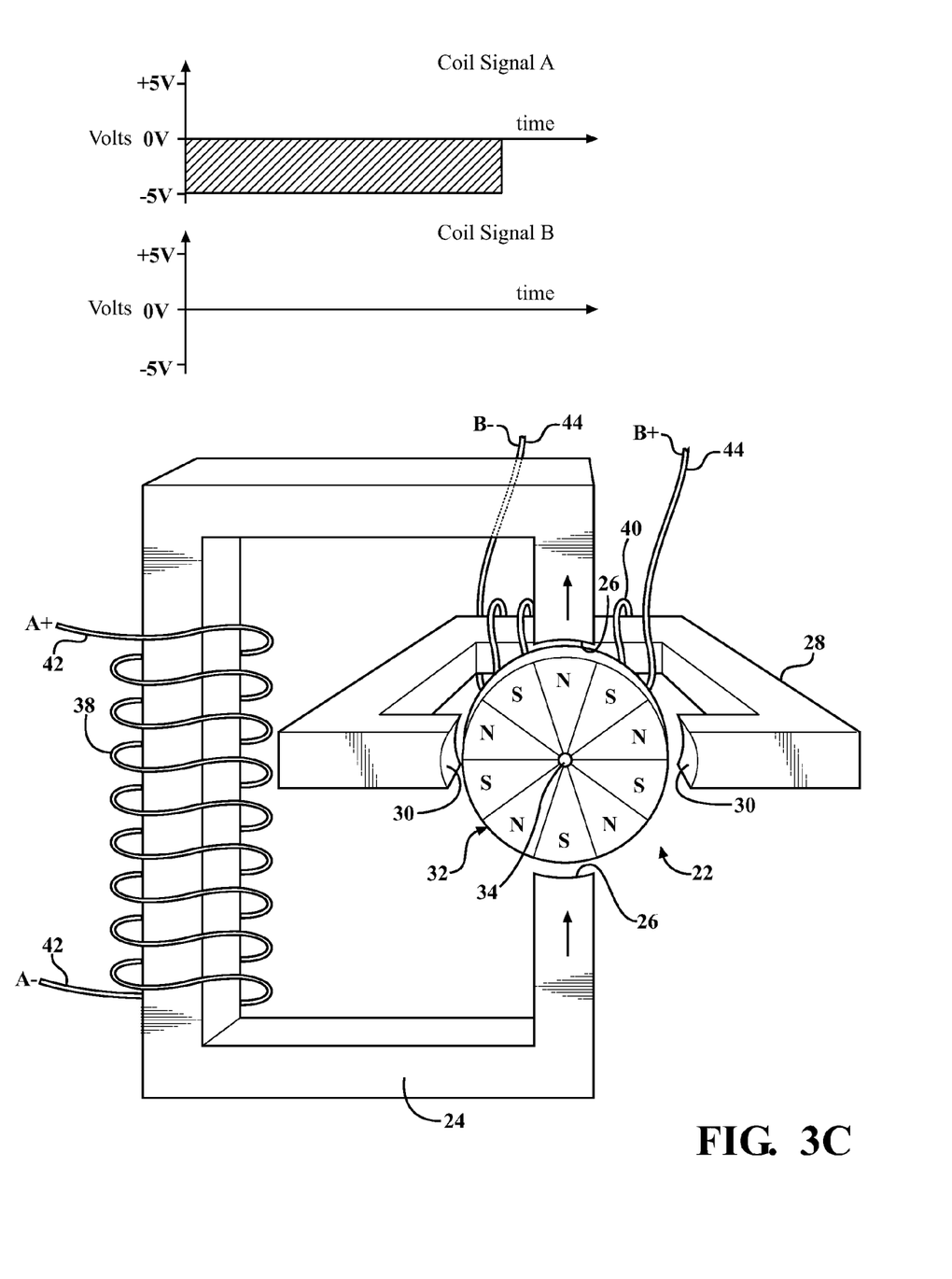
Figure 3D:
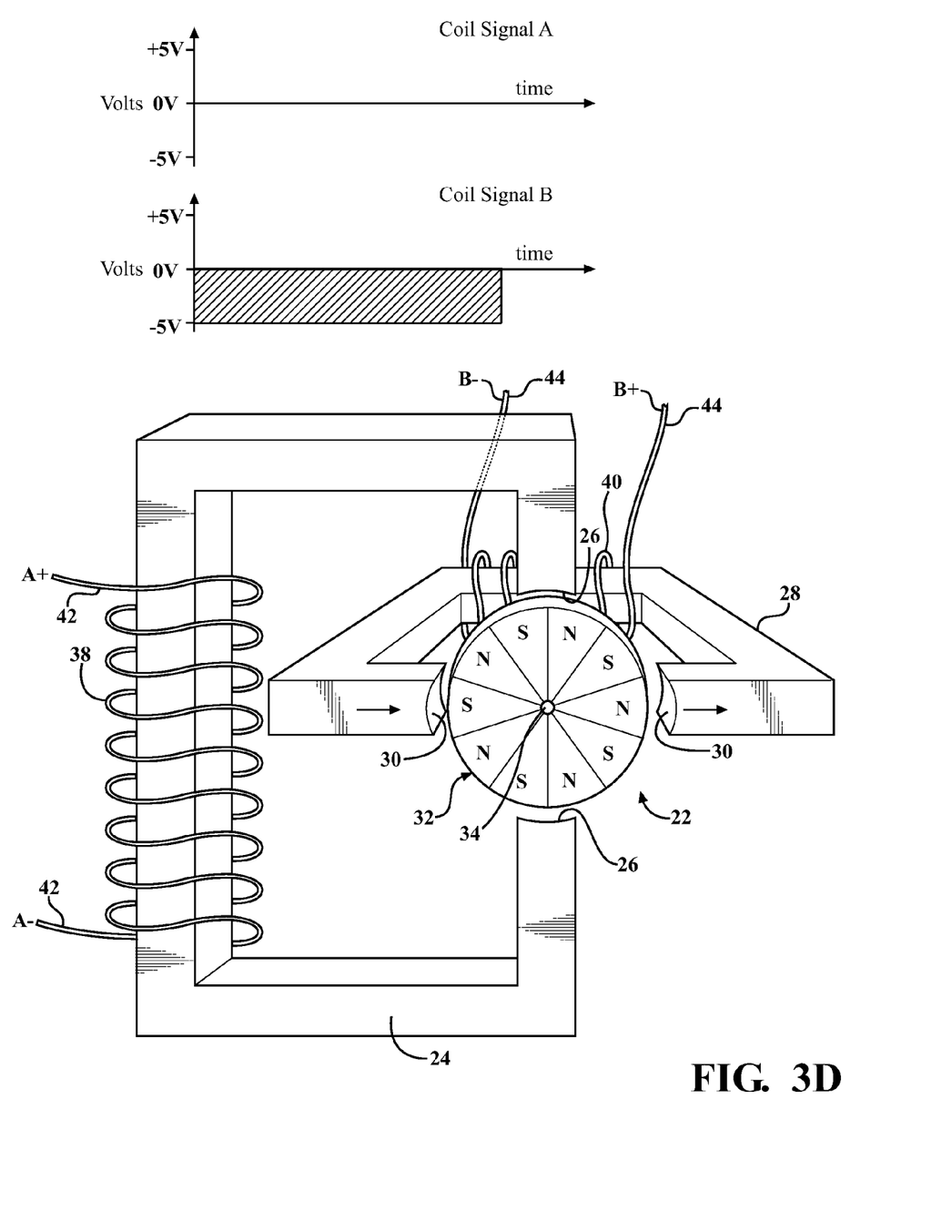

FIGS. 3A-3D show the exemplary motor during a series of "full steps" with the voltage applied alternately applied to the first and second inductive coils 38, 40. The alternating magnetic fields from the alternating voltages applied across the first and second leads 42, 44 causes the permanent magnet 32 to rotate about the axis of the rotor shaft 34. As shown in FIG. 3A, the permanent magnet 32 is in a first position. To rotate the permanent magnet 32 to the position of FIG. 3B, a positive voltage has been applied across the second inductive coil 40, which caused the permanent magnet 32 to rotate by approximately eighteen degrees (18°) in a clockwise direction from the position of FIG. 3A. To rotate the permanent magnet 32 to the position of FIG. 3C, the voltage across the second inductive coil 40 was returned to zero, and a negative voltage was applied across the first inductive coil 38, which caused the permanent magnet 32 to rotate by approximately eighteen degrees (18°) in a clockwise direction from the position of FIG. 3B. To rotate the permanent magnet 32 to the position of FIG. 3D, the voltage across the first inductive coil 38 was returned to zero, and a negative voltage was applied across the second inductive coil 40, which caused the permanent magnet 32 to rotate by approximately eighteen degrees (18°) in a clockwise direction from the position of FIG. 3C. It should be appreciated that manipulation of the voltages applied to the first and second inductive coils 38, 40 can cause the permanent magnet 32 to rotate in either a clockwise or a counter-clockwise direction.

The stepper motor 22 can also be "micro-stepped". Micro-stepping involves substantially continuously energizing both the first and second inductive coils 38, 40 with out-of-phase time varying voltages. Each micro-step rotates the permanent magnet 32 less than each full-step rotation, which is described above. Micro-stepping is often advantageous because it provides for greater control and smoother movement of the stepper motor 22. In the exemplary embodiment, the rotation of six microsteps is approximately equivalent to the rotation of one full-step.

The rotation of the permanent magnet 32 by the manipulation of voltages applied to the first and second induction coils 38, 40 as described above causes a change in the magnetic flux of the conductive core associated with any undriven inductive coils 38, 40. The undriven inductive coil opposes the change in magnetic field, thereby inducing a current in the undriven coil. The change in the current of the undriven inductive coil induces a voltage across the first or second leads 42, 44, which can be measured. This induced voltage is referred to as back electro-motive force (EMF). The back EMF voltage is transmitted to the rectification device 54 through the control system inputs 46, where it is rectified and transmitted to the integrator device 56 as the rectified signal. The integrator device 56 then integrates the rectified signal with respect to time to produce the integrated signal and transmits the integrated signal to the detector device 50, which compares the integrated signal to a predetermined threshold. If the integrated signal is less than the predetermined threshold, then the detector device 50 determines that the stepper motor 22 is in a stall condition, i.e. there is very little back EMF because the motor is not moving or is only slightly moving.

As explained above, when micro-stepping the stepper motor 22, both the first and second inductive coils 38, 40 are substantially continuously driven. Therefore, to measure the back EMF while micro-stepping the stepper motor 22, it may be necessary to temporarily remove the driving voltage applied to one of the inductive coils 38, 40 while a sample of the back EMF is taken. This process can be extremely quick and does not substantially affect the rotation of the permanent magnet 32.

FIG. 4 includes an instrument pointer 36 for an instrument panel of a vehicle. The instrument pointer 36 is coupled to the stepper motor 22 and could be used for a range of readings; for example, it could be a speedometer, a tachometer, a coolant temperature indicator, etc. A pointer stop 66 is disposed on the instrument panel for stopping the instrument pointer 36 and the stepper motor 22 in a predetermined position. This pointer stop 66 is also positioned so that the permanent magnet 32 of the stepper motor 22 is in a known orientation when the instrument pointer 36 abuts the pointer stop 66. If the instrument pointer 36 is being used in a speedometer, then the pointer stop 66 is preferably positioned so that the instrument pointer 36 reads "zero miles per hour" while resting against the pointer stop 66. Although the pointer stop 66 of the exemplary embodiment is shown external to the stepper motor 22, it should be appreciated that the stop could be internal to the stepper motor 22, and thus not visible to occupants of the vehicle.

When the stepper motor 22 is manufactured, it is preferably calibrated to return to a micro rotor off-set value (µROV) position whenever the stepper motor 22 is disabled, for example, when the vehicle is turned off. The µROV position of the exemplary embodiment is in close proximity to the pointer stop 66. In other words, in the exemplary embodiment, when the vehicle is turned off, the instrument pointer 36 automatically moves to a position adjacent the pointer stop 66. However, in certain circumstances, the stepper motor 22 might fail to return to the µROV position, e.g. when the vehicle suddenly loses power. Thus, whenever the vehicle is started, it is necessary to ensure that the instrument pointer 36 is in the proper position to prevent an inaccurate reading.

Figure 7:
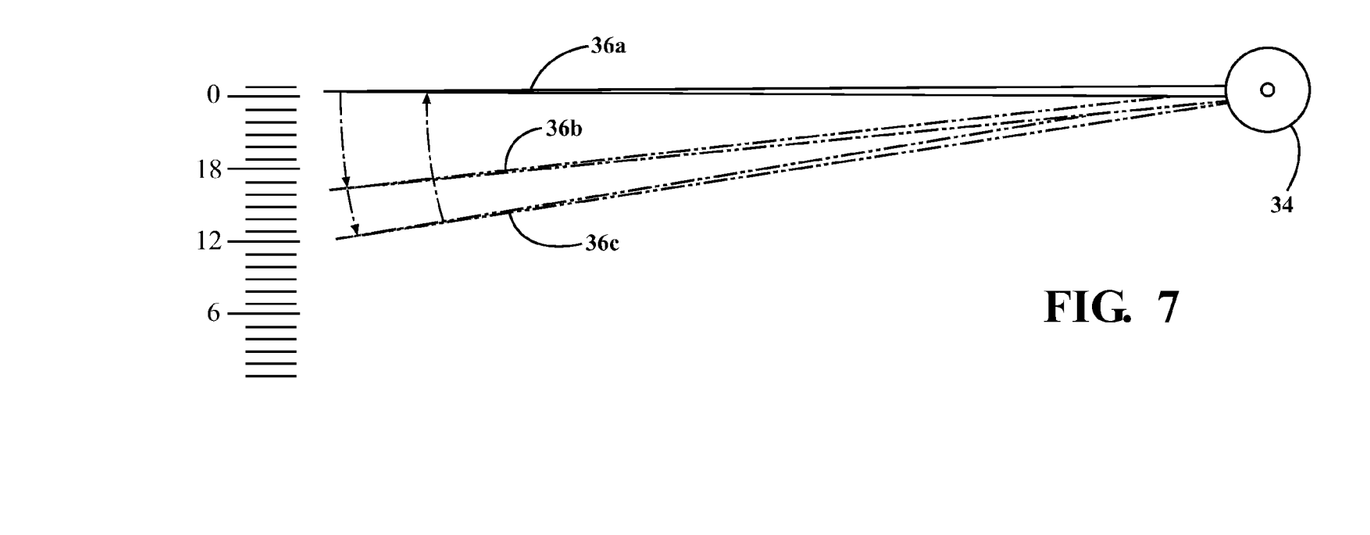
FIG. 7 is a front view showing the amplified movement of the instrument pointer during the no-twitch stepper stall detection process.
Figure 8:
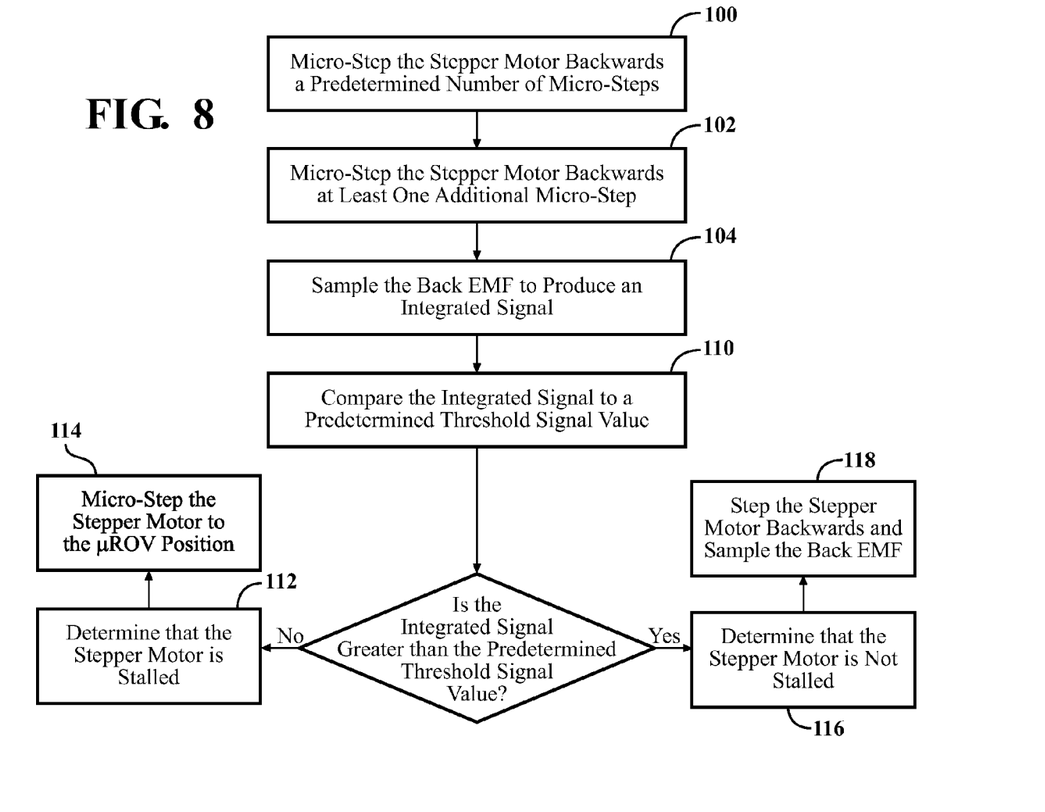
FIG. 8 is a flow chart of the exemplary method of detecting a condition in a stepper motor.

When the vehicle is started, the programmable control system 20 automatically puts the stepper motor 22 through a no-twitch stepper stall detect process to ensure that the stepper motor 22 is at the proper µROV position. FIG. 7 shows the movement of an exemplary instrument pointer 36a, 36b, 36c as it moves during the no-twitch stepper stall detect process. It should be appreciated that the movement of the instrument pointer 36 is amplified in FIG. 7 for illustration purposes. The instrument pointer 36 begins in a first position 36a, and the stall detect process starts with an alignment phase. The alignment phase includes the step 100 of micro-stepping the stepper motor 22 backwards for a predetermined number of steps to a second position 36b. To micro-step the stepper motor 22 backwards, the programmable control system 20 outputs voltages to the first and second inductive coils 38, 40 of the stepper motor 22 to move the stepper motor 22 backwards, or counter-clockwise in reference to the exemplary stepper motor 22 of FIG. 2, by typically eight (8) micro-steps. The number of micro-steps taken varies depending upon the starting micro-step position and is calculated to move the stepper motor 22 two (2) micro-steps past the next full step state. The delay between each of the micro-steps is preferably between sixty and one hundred and twenty milliseconds (60-120 ms). After micro-stepping backwards by the eight micro-steps, if the stepper motor 22 started in the proper µROV position, the stepper motor 22 should now be in the stall zone with the instrument pointer 36 pressing against the pointer stop 66. There may even be a slight compression of the instrument pointer 36 against the pointer stop 66.

After the alignment phase, the stall detect process continues with a stall detection phase. The stall detection phase includes the simultaneous steps 102, 104 of micro-stepping the stepper motor 22 backward and monitoring the back EMF of the stepper motor 22. Preferably, the stepper motor 22 is stepped backward to a third position 36c, which is also the next full step position. The third position 36c is typically the equivalent of four additional micro-steps away from the second position 36b. In the exemplary embodiment, the back EMF is sampled every one to three milliseconds (1-3 ms) and most preferably every two milliseconds (2 ms).

Figure 9:
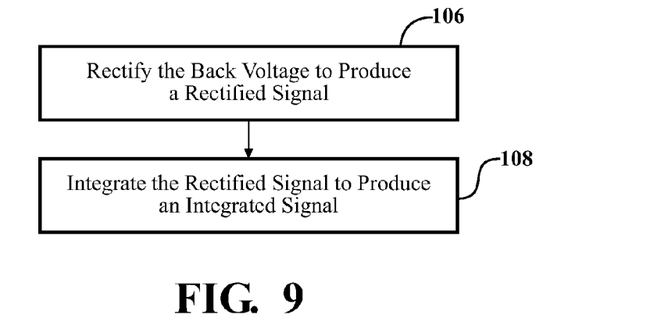
FIG. 9 is a flow chart of the exemplary process of sampling and integrating the back EMF.

In the exemplary embodiment, the step 104 of monitoring the back EMF includes the step 106 of rectifying the back EMF voltage with the rectification device 54 to produce a rectified signal. Next, the monitoring of the back EMF continues with the step 108 of integrating the rectified signal with respect to time with an integrator device 56 to produce an integrated signal. In the exemplary embodiment, the back EMF is sampled by the programmable control system 20 approximately every two milliseconds (2 ms), and at least twelve (12) samples are taken. The monitoring of the back EMF continues with the step 110 of comparing the integrated signal to a predetermined threshold signal value with a detection device. It should be appreciated that number of samples taken, the sampling rate and the number of micro-steps moved are not limited to those provided in the exemplary embodiment.

Figure 5:
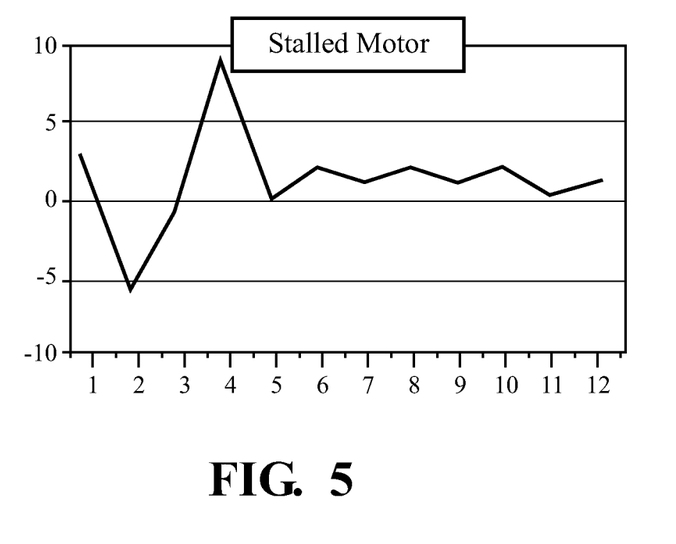
FIG. 5 is a plot of sampled back EMF measurements taken with the exemplary stepper motor in a stall condition.

If the integrated signal is less than the predetermined threshold signal value, then the permanent magnet 32 must be stationary, or nearly stationary, and the stall detect process continues with the step 112 of determining that the stepper motor 22 is in a stall condition. FIG. 5 shows the readings of twelve (12) back EMF samples taken of the exemplary stepper motor 22 in a stall condition. As can be seen, the magnitude of the back EMF voltage is as high as nine millivolts (9 mV). If the stepper motor 22 is stalled, then the programmable control system 20 puts the stepper motor 22 through a relaxation phase. The relaxation phase includes the step 114 of micro-stepping the stepper motor 22 back to the μROV position. Once in the μROV, the stepper motor 22 is ready for use, for example to indicate the speed of the vehicle.

Figure 6:
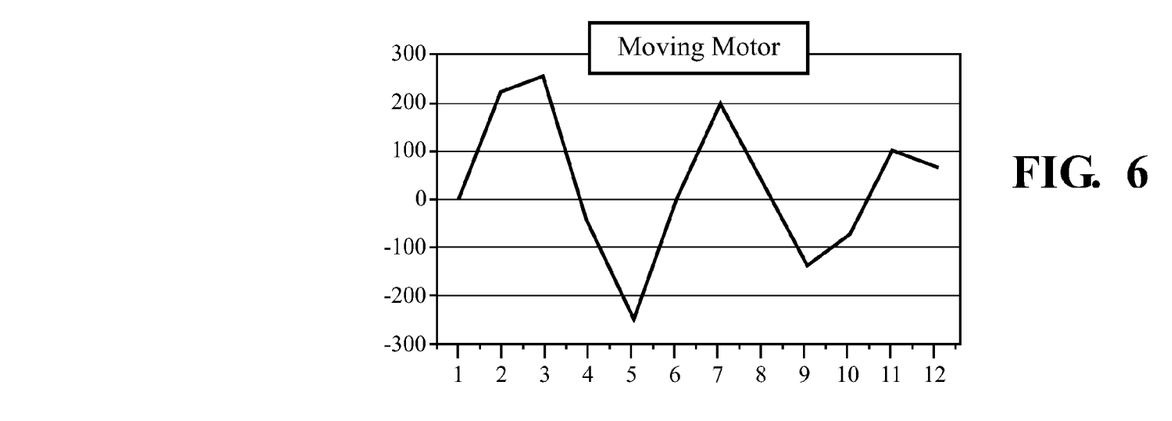
FIG. 6 is a plot of sampled back EMF measurements taken with the exemplary stepper motor in a non-stall condition.

If the integrated signal is greater than the predetermined threshold signal value, then the permanent magnet 32 was rotating (not stalled) while micro-stepping during the stall detect phase. FIG. 6 shows a plot of the readings of twelve (12) back EMF samples taken of a moving stepper motor 22. As can be seen, the magnitude of the back EMF voltage is as high as two hundred and fifty millivolts (250 mV). If the stepper motor 22 was not in a stall condition during the stall detection process, then the method continues with the step 116 of determining that the stepper motor 22 is not stalled. Next, the programmable control system 20 begins a homing phase. In the exemplary embodiment, the homing phase includes the step 118 of stepping (either full-steps or micro-steps) the stepper motor 22 in a backwards direction while measuring the back EMF until the programmable control system 20 determines that the stepper motor 22 is in a stall position. These steps could be full-steps or micro-steps. Alternately, the programmable control system 20 could repeat the no-twitch stepper stall detect process.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method for detecting a condition of a stepper motor, comprising the steps of:
    providing a stop for stalling the stepper motor;
    micro-stepping the stepper motor in a first direction toward the stop for a predetermined number of micro-steps;
    simultaneously micro-stepping the stepper motor in the first direction toward the stop for at least one additional micro-step to compress the stepper motor against the stop and sampling the back electro-motive-force (EMF) of the stepper motor;
    integrating the back EMF samples;
    comparing the integrated back EMF samples to a predetermined threshold to determine whether the stepper motor is in a stall condition; and
    in response to the integrated back EMF samples being under the predetermined threshold, micro-stepping the stepper motor to a micro-Rotor Offset Value (μROV), and
    in response to the integrated back EMF samples being greater than the predetermined threshold, stepping the stepper in the first direction and iteratively re-preforming the integrating and the comparing,
    wherein the steps are performed in response to a vehicle starting.

2. The method as set forth in claim 1 wherein the stepper motor is attached to an instrument pointer and the stop is a pointer stop.

3. The method as set forth in claim 1 further including the step of rectifying the back EMF samples to produce a rectified output signal having a single polarity before the step of integrating the back EMF samples.

4. The method as set forth in claim 3 wherein the step of integrating the back EMF samples is further defined as integrating the rectified output signal.

5. The method as set forth in claim 1 further including the steps of stepping the stepper motor in the first direction toward the stop and sampling the back EMF and integrating the back EMF samples until the stepper motor is in a stall condition.

6. The method as set forth in claim 1 wherein the predetermined number of micro-steps is no greater than eight.

7. The method as set forth in claim 1 wherein no less than twelve back EMF samples are taken.

8. The method as set forth in claim 7 wherein the back EMF samples are taken every one to three milliseconds.

9. A method for detecting a condition of a stepper motor assembly including an instrument pointer for indicating a condition of a vehicle, comprising the steps of:
    providing a pointer stop;
    stepping the stepper motor to a calibrated micro-Rotor Offset Value (μROV) position with the instrument pointer adjacent the pointer stop;
    micro-stepping the motor in a first direction toward the pointer stop;
    simultaneously micro-stepping the motor in the first direction at least one additional step to compress the stepper motor against the pointer step and sampling the back electro-motive-force (EMF) of the stepper motor;
    integrating the back EMF samples; and
    comparing the integrated back EMF samples to a predetermined threshold to determine whether the stepper motor is in a stall condition; and
    in response to the integrated back EMF samples being under the predetermined threshold, micro-stepping the stepper motor to a micro-Rotor Offset Value (μROV), and
    in response to the integrated back EMF samples being greater than the predetermined threshold, stepping the stepper in the first direction and iteratively re-performing the integrating and the comparing, wherein the steps are performed in response to a vehicle starting.

10. A stepper motor assembly comprising:
a permanent magnet having at least one pair of magnetic poles;
a first inductive coil and a second inductive coil for producing magnetic fields to rotate said permanent magnet;
a stop for preventing said permanent magnet from moving past a predetermined position;
a control system in electrical communication with said first and second inductive coils and having a referencing operation for selectively supplying voltages to said first and second inductive coils to move said permanent magnet to a calibrated micro-Rotor Offset-Value (μROV) and then for selectively supplying voltages to said first and second inductive coils to move said permanent magnet a predetermined number of micro-steps in a first direction toward said stop and for selectively supplying voltages to move said permanent magnet at least one additional micro-step while receiving at least one back EMF sample from said stepper motor to determine whether said stepper motor is in a stall condition; and
in response to the integrated back EMF samples being under the predetermined threshold, micro-stepping the stepper motor to a micro-Rotor Offset Value (μROV), and
in response to the integrated back EMF samples being greater than the predetermined threshold, stepping the stepper in the first direction and iteratively re-preforming the integrating and the comparing,
wherein the control system is configured to in operate in response to a vehicle starting.

11. The stepper motor assembly as set forth in claim 10 further including a permanent magnet coupled to an indicator.

12. The stepper motor assembly as set forth in claim 11 further including conductive core of a magnetic material and presenting first conductive core ends adjacent said permanent magnet.

13. The stepper motor assembly as set forth in claim 12 wherein said first inductive coil is wrapped around at least a portion of said first conductive core.

14. The stepper motor assembly as set forth in claim 12 further including a second conductive core of a magnetic material and presenting second conductive core ends adjacent said magnet.

15. The stepper motor assembly as set forth in claim 14 wherein said second inductive coil is wrapped around at least a portion of said second conductive core.

* * * * *